United States Patent [19]
Domahidy

[11] 4,410,432
[45] Oct. 18, 1983

[54] PROCESS FOR REMOVING HYDROGEN SULFIDE FROM FLUIDS

[75] Inventor: George Domahidy, Englewood, Colo.

[73] Assignee: Stone & Webster Engineering Corp., Boston, Mass.

[21] Appl. No.: 267,502

[22] Filed: May 27, 1981

[51] Int. Cl.³ .................. C02F 11/14; B01D 19/04
[52] U.S. Cl. .................................. 210/750; 55/53; 60/641.2
[58] Field of Search .......... 423/220, 234, 238, 420, 423/563, DIG. 19; 210/170, 750; 60/641.2; 55/53

[56] References Cited

U.S. PATENT DOCUMENTS 4,259,300  3/1981  Lieffers ........................ 423/224

OTHER PUBLICATIONS

The Geothermal Source, Petroleum Information Corporation, 1979, pp. 46-49 and 100-103.
Finney, "The Geysers Geothermal Power Plant", Chemical Engineering Progress, vol. 68, No. 7, Jul. 1972, pp. 83-86.
Laslo, "Application of the Stretford Process for H$_2$S Abatement at the Geysers Geothermal Power Plant", 11th Inter Society Energy Conversion Engineering Conference, 1976, pp. 724-730.
Beychok, "Aqueous Wastes from Petroleum and Petrochemical Plant", pp. 175-181.

*Primary Examiner*—Earl C. Thomas
*Attorney, Agent, or Firm*—Hedman, Casella, Gibson, Costigan & Hoare

[57] ABSTRACT

A process is disclosed for removing hydrogen sulfide from fluid, particularly geothermal steam. Carbonic acid is sprayed into a condenser to inhibit dissolution of hydrogen sulfide into the condensate and maintain the hydrogen sulfide in gaseous form.

6 Claims, 1 Drawing Figure

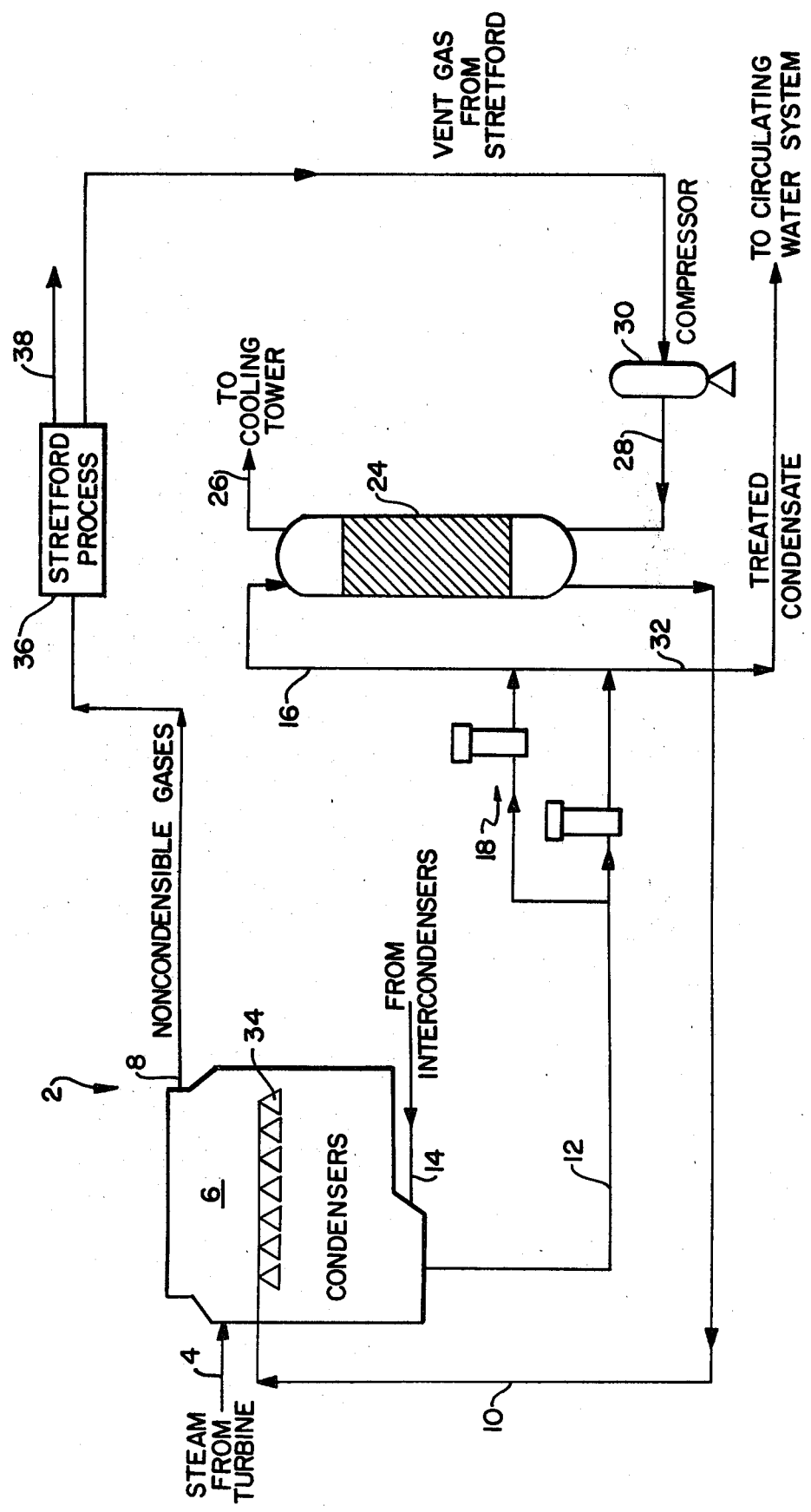

PROCESS FOR REMOVING HYDROGEN SULFIDE FROM FLUIDS

FIELD OF THE INVENTION

This invention relates to a process and system for removing hydrogen sulfide ($H_2S$) from a stream. More specifically, the invention relates to a process and system for removing hydrogen sulfide from geothermal steam. Most specifically, the invention relates to a process for removing hydrogen sulfide from geothermal steam used to drive a steam turbine by introducing carbonic acid into the condenser of the turbine generator system powered by geothermal steam.

DESCRIPTION OF THE PRIOR ART

Hydrogen sulfide is a pollutant that should not be discharged into the environment. As a result, several states are investigating the merits of specifying the hydrogen sulfide level or content that effluent entering the environment can contain. For example, it is expected that Sonoma County, Calif. will establish a standard requiring that the hydrogen sulfide content in any stream being discharged into the environment be below five (5) parts per million parts of water (ppmw).

One source of hydrogen sulfide is geothermal steam. Geothermal steam is high pressure steam from a natural source. Typically, geothermal steam contains entrained compounds, one of which is hydrogen sulfide. Notwithstanding, geothermal steam is a very desirable source of energy that can be used for many purposes. One purpose is to drive the turbine-generators of electrical power producing plants. In practice, untreated geothermal steam is delivered to the turbine of the turbine-generator to provide the motive force for rotating the turbine shaft. As in all typical steam turbine installations, the discharge must either be rejected to the environment or recycled.

The spent geothermal steam that is discharged from a steam turbine becomes high in hydrogen sulfide content by virtue of accumulation in the condensate of the turbine-generator condenser. In practice it has been found that a significant portion (about 50%) of the hydrogen sulfide originally contained in the geothermal steam will be entrained in the condenser condensate while the uncondensed gas phase or vapor discharged from the condenser contains the remainder of the hydrogen sulfide. As a result, recycle of the condensate or return of the condensate to the geothermal steam source will continually increase the hydrogen sulfide in the system or the geothermal source. Either result is undesirable and unacceptable.

The problem of hydrogen sulfide removal has received attention. At present, removal of hydrogen sulfide from geothermal steam is by hydrogen peroxide oxidation of hydrogen sulfide. The cost of hydrogen peroxide is considerable and can be avoided by the process of this invention.

It is also believed that the Pacific Gas and Electric Co. has tried and used sulfuric acid in the condenser condensate to reduce the pH of the condensate and thereby prevent hydrogen sulfide from dissolving in the condensate. The sulfuric acid used has been commercial grade obtained from a commercial supply and delivered to the site.

It is believed that the use of stripping processes to effect hydrogen sulfide removal has also been investigated. The previous stripping processes considered for hydrogen sulfide removal have been directed to either steam stripping or flue gas stripping. The steam stripping processes have employed pure steam in an effort to strip the hydrogen sulfide from condensate. The process employing flue gas to strip hydrogen sulfide from sour water is disclosed in *Aqueous Wastes from Petroleum and Petrochemical Plants* by Milton R. Beychok. The flue gas contains three to six (3-6) percent oxygen, eight to twelve (8-12) percent carbon dioxide with the balance being nitrogen.

SUMMARY OF THE INVENTION

It is an object of the invention to provide a process and system for removing hydrogen sulfide from fluid.

It is another more specific object of the invention to provide a process and system for removing hydrogen sulfide from geothermal steam.

It is a further object of the invention to provide a process and system for removing hydrogen sulfide from geothermal steam by preventing hydrogen sulfide from dissolving in the condensate of the condensed spent geothermal steam discharged from the turbine of a turbine-generator system powered by geothermal steam.

The system of the invention includes a carbon dioxide absorption tower, and a Stretford Process facility. In operation, the spent geothermal steam used to drive a steam turbine-generator is delivered to the conventional turbine condenser. The spent geothermal steam contains, among other compounds and elements, carbon dioxide ($CO_2$), hydrogen sulfide ($H_2S$), hydrogen ($H_2$) and methane ($CH_4$).

The gases from the spent geothermal steam are taken overhead from the condenser and delivered to the Stretford Process facility. The gases are processed in the Stretford Process facility and the vent gases consisting in large part of carbon dioxide are compressed and delivered to the carbon dioxide Absorption Tower. A portion of the condensate from the condenser is also delivered to the carbon dioxide absorption tower. The gas and treated condensate are brought together under high pressure; i.e. 10 atmospheres or higher. Under these high pressure conditions the carbon dioxide in the Stretford vent gas dissolves in the treated condensate and forms carbonic acid.

The carbonic acid is returned to the turbine condenser and sprayed into the condensate to depress the pH of the condensate. At low pH the hydrogen sulfide can not dissolve in the condensate and thus remains in the gas phase facilitating removal from the condenser with the overhead vapor which can be handled and processed in the Stretford Process system.

BRIEF DESCRIPTION OF THE DRAWINGS

A specific embodiment of the invention will be described with reference to the drawing which is a schematic drawing of the system of one embodiment of the invention.

DESCRIPTION OF THE PREFERRED EMBODIMENT

The process of the invention has particular utility in power plants that use geothermal steam to drive the turbine of a turbine-generator. The preferred embodiment is described in that environment.

The system 2 includes a carbon dioxide absorption tower 24, a Stretford Process facility 36, a compressor 30, condensate pumps 18 and associated lines for transport of the various streams.

Line 4 connects the discharge from the conventional turbine (not shown) to the condenser 6 of the turbine-generator system. The condenser 6 is conventional except for the inclusion of spray nozzles 34, thus it is operated under vacuum.

Line 8 is provided to deliver condenser overhead vapor to the Stretford Process facility 36. Line 12 is provided to convey the condenser bottoms or the condensate to the carbon dioxide absorption tower 24 and line 10 to return the carbonic acid from the carbon dioxide absorption tower 24 to the condenser 6 through the spray nozzles 34.

Line 28 is provided to deliver vent gases from the Stretford Process facility 36 to the carbon dioxide absorption tower 24 and line 26 to transport the overhead from the carbon dioxide absorption tower 24 to a cooling tower (not shown).

Line 32 is provided to deliver the major portion of the treated condensate to the circulating water system.

In operation, spent geothermal steam is delivered from a steam turbine to the condenser 6. The spent geothermal steam contains, among other compounds and elements, carbon dioxide, hydrogen, hydrogen sulfide and methane. Geothermal steam from system ejectors may also be delivered to the condenser 6 through line 14. The condenser condensate is kept at a low pH by the delivery of carbonic acid from a carbon dioxide absorption tower 24. The carbonic acid is sprayed through nozzles 34 into the condenser 6. Thus, the condensate is treated by carbonic acid to prevent dissolution of hydrogen sulfide into the condensate. The key is the provision of sufficient carbonic acid to tie up the ammonia ($NH_3$) in the condensate. The carbonic acid ($H_2CO_3$) entering the fluid reacts with ammonia ($NH_3$) to liberate the hydrogen sulfide ($H_2S$) as a gas. Although the ammonia content of the condensate will vary as a function of the geothermal steam, practice has shown that a mole ratio of 2 to 1 carbon dioxide to ammonia will sufficiently tie up the ammonia to liberate the hydrogen sulfide in the condensate as a gas.

The treated condensate which is essentially free of hydrogen sulfide, but which is at a low pH, can be delivered through lines 12 and 32 to the circulating water system.

A small portion of the treated condensate is branched from line 12 and pumped by condensate pumps 18 through line 16 to the carbon dioxide absorption tower 24.

The overhead vapor from the condenser 6 contains virtually all of the hydrogen sulfide and the other gases found in the geothermal steam. The hydrogen sulfide rich vapor is taken overhead through line 8 and delivered to the Stretford Process facility 36 where the hydrogen sulfide is removed and discharged through line 38. The vent gases remaining are carbon dioxide rich. The vent gases are normally about fifty (50) percent carbon dioxide.

The vent gases from the Stretford Process facility 36 containing carbon dioxide are compressed by the compressors 30 to high pressure, i.e. 10 atmospheres or more, and delivered under pressure to the carbon dioxide absorption tower 24.

The high content carbon dioxide vent gases from line 28 dissolve in the treated condensate in the carbon dioxide absorption tower 24 due to the high pressure environment, thus converting to carbonic acid. It is necessary that the condensate used to dissolve the carbon dioxide to form carbonic acid is essentially hydrogen sulfide free, thus the treated condensate from the condenser 6 is ideal. The carbonic acid formed in the carbon dioxide absorption tower 24 is transported through line 10 to the condenser spray nozzles 34 for discharge into the condenser 6. The pH of the condenser condensate is thus kept low by by continual delivery of carbonic acid to the condenser 6 in sufficient amount to tie up the ammonia in the condenser.

The following is test data from pilot plant tests conducted to determine the performance of the invention are as follows:

TABLE I

| | | | 1 | 2 | 3 | 4 | 5 | 6 | 7 |
|---|---|---|---|---|---|---|---|---|---|
| | Program Test Number | | | | | | | | |
| | Test Date | | 3/10/81 | 3/10/81 | 3/10/81 | 3/10/81 | 3/10/81 | 3/26/81 | 3/26/81 |
| | Test Start Time | | 14:37 | 17:25 | 18:07 | 21:21 | 16:08 | 14:40 | 16:00 |
| | Column Bottom Pressure | PSIA | 1.86 | 1.84 | 1.85 | 1.95 | 1.84 | 2.73 | 2.81 |
| STEAM | Flowrate | LB/HR total | 128 | 128 | 127 | 127 | 127 | 224 | 224 |
| FEED | Temperature | °F. | 166 | 169 | 170 | 171 | 165 | 209 | 208 |
| (line 28) | Superheat | °F. | 44 | 46 | 47 | 45 | 43 | 72 | 71 |
| Hydrogen | Flowmeter Reading | PPMW $H_2S$ | 150 | 210 | 508 | 210 | 210 | 118 | 118 |
| Sulfide | Flowmeter Reading | LB/HR $H_2S$ | 0.0192 | 0.0271 | 0.0650 | 0.0271 | 0.0271 | 0.0265 | 0.0265 |
| | Wet Chemical Analysis | PPMW $H_2S$ | 180 | 230 | — | 230 | 230 | 160 | — |
| | Wet Chemical Analysis | LB/HR $H_2S$ | 0.023 | 0.029 | — | 0.029 | 0.029 | 0.036 | — |
| Ammonia | Flowmeter Reading | PMW $NH_3$ | 56 | 28 | 28 | 28 | 28 | 22 | 22 |
| | Flowmeter Reading | LB/HR $NH_3$ | 0.00714 | 0.00363 | 0.00363 | 0.00363 | 0.00363 | 0.00497 | 0.00497 |
| Carbon | Flowmeter Reading | PPMW $CO_2$ | 5300 | 7080 | 7080 | 7080 | 7080 | 2920 | 2920 |
| Dioxide | Flowmeter Reading | LB/HR $CO_2$ | 0.678 | 0.906 | 0.906 | 0.906 | 0.906 | 0.653 | 0.653 |
| | GC Analysis | PPMW $CO_2$ | 5080 | 7180 | 7300 | 7000 | 7240 | 3100 | 2730 |
| | GC Analysis | LB/HR $CO_2$ | 0.65 | 0.92 | 0.93 | 0.89 | 0.92 | 0.69 | 0.61 |
| WATER | Flowrate | LB/HR Total | 110 | 110 | 110 | 120 | 110 | 130 | 260 |
| FEED | Temperature | °F. | 120 | 101 | 97 | 79 | 112 | 56 | 48 |
| (line 16) | pH | | 5.5 | 6.0 | 5.9 | 5.6 | 6.1 | 5.8 | 7.8 |
| Hydrogen | ISE Analysis | PPMW $H_2S$ | <<1 | <<1 | <<1 | <<1 | <<1 | <<1 | <<1 |
| Sulfide | ISE Analysis | LB/HR $H_2S$ | 0 | 0 | 0 | 0 | 0 | 0 | 0 |
| Ammonia | ISE Analysis | PPMW $NH_3$ | 32 | 81 | 70 | 68–80 | 90 | 80 | 58 |
| | ISE Analysis | LB/HR $NH_3$ | 0.035 | 0.0089 | 0.0077 | 0.0089 | 0.0099 | 0.010 | 0.015 |
| Carbon | TIC Analysis | PPMW $CO_2$ | 730 | 400 | 400 | 1800 | 370 | 953 | 150 |
| Dioxide | TIC Analysis | LB/HR $CO_2$ | 0.080 | 0.044 | 0.044 | 0.22 | 0.041 | 0.12 | 0.039 |
| b BOTTOMS | Flowrate by Mass Balance | LB/HR Total | 112 | 123 | 117 | 138 | 113 | 136 | 286 |
| (line 10) | Flowrate, Measured | LB/HR Total | 106 | — | 108 | — | 109 | 150 | 271 |

TABLE I-continued

| | Program Test Number | | 1 | 2 | 3 | 4 | 5 | 6 | 7 |
|---|---|---|---|---|---|---|---|---|---|
| | Test Date | | 3/10/81 | 3/10/81 | 3/10/81 | 3/10/81 | 3/10/81 | 3/26/81 | 3/26/81 |
| | Test Start Time | | 14:37 | 17:25 | 18:07 | 21:21 | 16:08 | 14:40 | 16:00 |
| | Column Bottom Pressure | PSIA | 1.86 | 1.84 | 1.85 | 1.95 | 1.84 | 2.73 | 2.81 |
| | Temperature | °F. | 122 | 123 | 123 | 126 | 122 | 137 | 137 |
| | pH | | | | | | | | |
| Hydrogen | ISE Analysis | PPMW $H_2S$ | <<1 | <<1 | <<1 | <<1 | <<1 | <<1 | <<1 |
| Sulfide | ISE Analysis | LB/HR $H_2S$ | 0 | 0 | 0 | 0 | 0 | 0 | 0 |
| Ammonia | ISE Analysis | PPMW $NH_3$ | 35 | 49 | 43 | 39–51 | 43 | 18 | 15 |
| | ISE Analysis | LB/HR $NH_3$ | 0.00392 | 0.00603 | 0.00503 | 0.00621 | 0.00486 | 0.00245 | 0.00429 |
| Carbon | TIC Analysis | PPMW $CO_2$ | 120 | 110 | 110 | 1000 | 130 | 73 | 51 |
| Dioxide | TIC Analysis | LB/HR $CO_2$ | 0.0134 | 0.0135 | 0.0129 | 0.138 | 0.0147 | 0.00993 | 0.0146 |
| OVERHEADS | Flowrate | LB/HR Total | 126 | 115 | 120 | 109 | 124 | 218 | 198 |
| (line 26) | Temperature | °F. | 118 | 120 | 120 | 123 | 119 | 132 | 131 |
| | Pressure | PSIA | 1.8 | 1.8 | 1.8 | 1.9 | 1.8 | 2.7 | 2.8 |
| Hydrogen | Mass Balance | PPMW $H_2S$ | 150 | 240 | 540 | 250 | 220 | 120 | 140 |
| Sulfide | Mass Balance | LB/HR $H_2S$ | 0.0192 | 0.0271 | 0.0650 | 0.0271 | 0.0271 | 0.0265 | 0.0265 |
| | Wet Chemical Analysis | PPMW $H_2S$ | 180 | 115 | 530 | 285 | 270 | 160 | 160 |
| | Wet Chemical Analysis | LB/HR $H_2S$ | 0.023 | 0.013 | 0.064 | 0.031 | 0.033 | 0.035 | 0.032 |
| Ammonia | Mass Balance | PPMW $NH_3$ | 53 | 57 | 53 | 58 | 70 | 59 | 80 |
| | Mass Balance | LB/HR $NH_3$ | 0.00672 | 0.00650 | 0.00630 | 0.00632 | 0.00867 | 0.0129 | 0.0158 |
| Carbon | Mass Balance | PPMW $CO_2$ | 5920 | 8140 | 7810 | 9060 | 7520 | 3520 | 3420 |
| Dioxide | Mass Balance | LB/HR $CO_2$ | 0.745 | 0.937 | 0.937 | 0.988 | 0.932 | 0.767 | 0.677 |
| | GC Analysis | PPMW $CO_2$ | 6240 | 7940 | 8180 | 10,600 | 7580 | 5210 | 5400 |
| | GC Analysis | LB/HR $CO_2$ | 0.79 | 0.91 | 0.98 | 1.16 | 0.94 | 1.14 | 1.07 |
| OVERHEADS | pH | | — | — | — | — | — | 7.0 | 7.2 |
| CONDENSATE | $H_2S$ by ISE | PPMW $H_2S$ | — | — | — | — | — | 70 | 35 |
| | $NH_3$ by ISE | PPMW $NH_3$ | — | — | — | — | — | 50 | 73 |
| | $CO_2$ by TIC | PPMW $CO_2$ | — | — | — | — | — | 140 | 110 |

The pilot plant facilities used to conduct tests 1–7 included a packed column (to simulate condenser 6), water and steam injection and removal systems, and associated instrumentation.

The facility was designed around a 12-in. diameter fiberglass column (simulated condenser 6) 12 ft. high, packed with ½-in. ceramic Intalox saddles to a depth of 5 ft. Fiberglass demister pads were installed in the upper section of this column to reduce entrained water in the overheads. A wide-angle spray nozzle above the packing insured uniform distribution of the liquid feed.

A simulated geothermal steam was prepared for this study by injecting $H_2S$, $NH_3$, and $CO_2$ into steam from an on-site boiler. The steam line included a knockout pot to remove entrained water and a superheater to regulate the steam temperature. The injection of $H_2S$, $NH_3$, and $CO_2$ into the steam line was controlled by a gas metering system. An in-line mixer was installed in the steam line downstream of the gas injection ports to insure the homogeneity of the steam feed.

The liquid feed system was designed to produce a range of simulated geothermal condensates and to supply carbonic acid for the tests. A water feed at the desired temperature was obtained by directly mixing cold tap water and hot boiler water. A concentrated solution of geothermal constituents; i.e., a 1.5 percent solution of ammonium bicarbonate, $NH_4HCO_3$, was injected into the water feed by a small metering pump. Carbonic acid was prepared in a 300 gal. tank equipped with a $CO_2$ sparger and a chiller to maintain low water temperatures. An in-line mixer was installed in the liquid feedline downstream of the injection ports.

The overhead vapor from the column was pulled off by a large vacuum pump. In order to reduce the load on the vacuum system, a surface condenser was installed in the overhead line. The overheads condensate was collected in a large tank which drained to the bottoms pump. The bottoms effluent from the column was cooled by a small stainless steel heat exchanger, and pumped to a drainage trench.

Corrosion resistant materials were used throughout the pilot plant to minimize side reactions with $H_2S$ and $NH_3$.

Liquid flowrates were measured with rotameters; orifice meters were used to measure steam flowrates. These flowmeters were calibrated in place with either water or steam. The flowrates of $CO_2$, $H_2S$, and $NH_3$ injected into the inlet steam line were measured with calibrated mass flowmeters. Temperatures were measured with thermocouples located in inlet and outlet lines, and were recorded on a multipoint strip chart recorder. Column pressures were measured with a mercury manometer.

Liquid and gas sampling ports were located on the inlet and outlet lines near the column in order to minimize any sample degradation. For the inlet lines, these sampling ports were downstream of an in-line mixer to assure a homogeneous sample. Perforated sampling tubes were installed in the gas lines to further insure a representative sample.

The inlet and outlet liquid streams were analyzed for $H_2S$, $NH_3$, and pH with an automated ion selective electrode (ISE) system. This system included three Orion ion selective electrodes (sulfide, ammonium, and hydrogen ions) maintained at 25° C. in a constant temperature water bath, chemical mixing equipment, and electronic output instrumentation.

The liquid streams were analyzed for $CO_2$ with a Beckman model 915 total inorganic carbon (TIC) analyzer. Both the ion selective electrode system and the inorganic carbon analyzer were rountinely calibrated between analyses in order to minimize instrument drift.

Vapor streams were analyzed for $CO_2$, air, and water with a Hewlett-Packard Model 530A gas chromatograph (GC) equipped with a thermal conductivity (TC) detector. A ⅛-in. teflon-lined aluminum column packed with Chromosorb 104 was installed in this chromatograph. This instrument was calibrated in the field to give a quantitative analysis for $CO_2$. Water and air were analyzed qualitatively only.

A wet chemical method was used to analyze for $H_2S$ in the vapor. The sampling train consisted of two cold bubblers in series followed by a dessicant tube to collect residual water. The $H_2S$ was collected in 2 N NaOH with ascorbic acid added as an antioxidant, and analyzed with the selective ion electrode system.

The results of the tests are summarized in Table II.

TABLE II

| | AMMONIA FIXATION SIMULATION TEST RESULTS AT 1.9 TO 2.8 PSIA | | | | | | |
|---|---|---|---|---|---|---|---|
| Program Test No. | Steam Feed | Water Feed | Overheads | Bottoms | $H_2S$ PPMW In Bottoms | $H_2S$ PPMW In Condensate | $CO_2$ PPMW In Bottoms |
| 1 | 128 | 110 | 126 | 112 | <<1 | — | 120 |
| 2 | 128 | 110 | 115 | 123 | <<1 | — | 110 |
| 3 | 127 | 110 | 120 | 117 | <<1 | — | 110 |
| 4 | 127 | 120 | 109 | 138 | <<1 | — | 1,000 |
| 5 | 127 | 110 | 124 | 113 | <<1 | — | 130 |
| 6 | 224 | 130 | 218 | 136 | <<1 | 70 | 73 |
| 7 | 224 | 260 | 198 | 286 | <<1 | 35 | 51 |

I claim:

1. A process for removing hydrogen sulfide from a fluid comprising the steps of:
    separating the fluid containing hydrogen sulfide into a vapor and a condensate;
    maintaining the condensate in a state that inhibits hydrogen sulfide from dissolving in the condensate by introducing carbonic acid into the condensate; and
    withdrawing the vapor.

2. A process as in claim 1 wherein the fluid containing hydrogen sulfide is steam and further comprising the step of creating a vacuum chamber wherein the steam containing hydrogen sulfide is separated into vapor and condensate.

3. A process as in claim 2 wherein the fluid containing hydrogen sulfide also contains carbon dioxide and further comprising the step of separating carbon dioxide from the vapor and recycling the separated carbon dioxide and condensate under pressure to generate a condensate rich in carbonic acid.

4. A process as in claim 3 further comprising the steps of elevating the pressure of the recycled carbon dioxide above ten atmospheres; delivering the carbon dioxide at above ten atmospheres pressure to the bottom of a carbon dioxide absorption tower; delivering condensate that has been treated to become free of hydrogen sulfide to the top of the carbon dioxide separation tower and passing the carbon dioxide and treated condensate countercurrently under pressure.

5. A process as in claim 1 wherein the fluid containing hydrogen sulfide also contains carbon dioxide and ammonia, said process further comprising the step of maintaining the mole ratio of carbon dioxide to ammonia in the condensate at about two to one.

6. A process as in claims 4 or 5 wherein the fluid containing hydrogen sulfide is geothermal steam.

* * * * *